TO VACUUM

TO VACUUM

TO VACUUM

Inventors:
Robert Leonard Breadner,
Charles Henry Simms,
by Vernet C. Kauffman
Their Attorney.

Patented Mar. 20, 1951

2,545,873

UNITED STATES PATENT OFFICE 2,545,873

METHOD OF MAKING STEMS FOR ELECTRIC LAMPS

Robert Leonard Breadner, Kenton, and Charles Henry Simms, Twickenham, England, assignors to General Electric Company, a corporation of New York Application August 6, 1947, Serial No. 766,658 In Great Britain April 10, 1945

Section 1, Public Law 690, August 8, 1946 Patent expires April 10, 1965

4 Claims. (Cl. 49—81)

This invention relates to improvements in methods for producing articles including a shaped glass part or parts for use with glass envelopes other than envelopes for thermionic valves. Such articles may, for example, be employed as glass foot or stem tube units for luminescent electric discharge lamps.

It has previously been proposed to produce such shaped glass articles by a pressing process in which the molten glass in a shaped die-block is pressed by a cooperating die. Such arrangements necessitate the use of glasses with a relatively wide working range of temperature since the molten glass may appreciably be chilled by contact with the die surface. Moreover it is not possible to produce relatively thin glass parts by this means and finally the machinery required is relatively complex.

The object of the present invention is to provide an improved method of producing shaped glass articles or stems for use with glass lamp envelopes, other than the envelopes of thermionic valves, in which these disadvantages are substantially overcome.

According to the present invention a method of producing a shaped glass part or parts such as a stem for use with glass lamp envelopes other than the envelopes of thermionic valves includes the steps of establishing a gaseous pressure difference across that part of a member of glass which is to be shaped and heating the glass whereby the said glass is forced into contact with a die-block of the desired shape.

Thus in one arrangement in accordance with the invention a channel or channels in a die-block of the required shape are arranged selectively to be connected to a vacuum source; accordingly part of a suitably pre-shaped glass member positioned in the die-block when heated to working temperature is then pressed by atmospheric pressure into contact with the die-block, and shaped accordingly.

Figure 1:
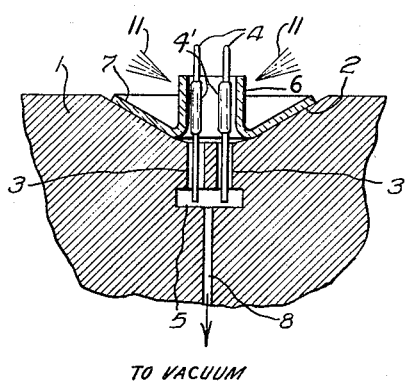
Figure 2:
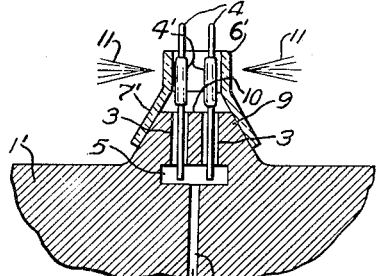

Two arrangements in accordance with the invention will now be described by way of example, with reference to the accompanying diagrammatic drawing in which Figure 1 is a sectional view in elevation of a die-block with the components in position and before heat is applied in accordance with the first arrangement and Figure 2 is a similar view in accordance with the second arrangement.

In the first arrangement, which will be described with reference to Figure 1 which is for producing a closure member or foot or stem for a tubular luminescent electric discharge lamp, the die-block I comprises a dish-like depression 2 provided with two recesses 3 into which are inserted two electrode support wires 4 which have preferably been pre-glassed as indicated at 4'. Such pre-glassing may, for example, be performed by a method such as is disclosed in our co-pending application for Patent No. 3,627/44, a layer of glass 4' being fused onto and around a portion of the length of the wire. A passage 5 in the die-block I in the neighbourhood of the two recesses 3 is arranged to be connected to a vacuum source, not shown, through the channel 8.

A pre-determined length of glass tube 6 is provided with an externally re-entrant flange or flare 7 which flange 7 is curved or flared at the proper angle to match the profile of the outer part of the depression 2 in the die block I. The flanged tube 6 is then positioned in the depression 2 around the two electrode support wires 4 and the end of the tube 6 remote from the die-block I is then heated, as by gas flames II.

The glass tube 6 eventually softens and collapses onto and around the two electrode support wires 4. The space between the molten glass and the die-block I is then connected to the vacuum source and the molten glass is then in effect sucked down into intimate contact with the die-block I by virtue of the gaseous pressure difference established on the two sides of the molten glass. In this manner the glass is drawn into a position immediately contiguous to the flare or flange 7 and is actually shaped and at the same time the two electrode support wires 4 are sealed into position.

In the second arrangement in accordance with the invention which will be described with reference to Figure 2, in which similar parts to those in Figure 1 are similarly referenced, the die-block I' is formed with an upstanding part of conical cross-section 9 having a flattened top 10.

Two recesses 3 are formed in the flattened top 10 for receiving the two pre-glassed electrode support wires 4. A passage 5 is formed in the die block in the neighbourhood of the recesses 3, which is connected to a vacuum source, not shown, through the channel 8.

A pre-determined length of glass tube 6' is again provided with a flange or flare 7' which is shaped approximately to conform with the upper part of the conical die-block I'. This flanged tube 6' is then positioned on the die-block I' and the end of the tube 6' remote from the die-block I' is then heated, as by gas flames II.

As in the previous arrangement, when the glass softens and collapses onto the two electrode support wires 4, the passage 5 in the die-block 1' is exhausted. The softened glass is then sucked down to a position immediately contiguous to the flare or flange 7' and accurately shaped by the die-block 1' and, simultaneously, the two electrode wires 4 are sealed into position.

Figure 3:
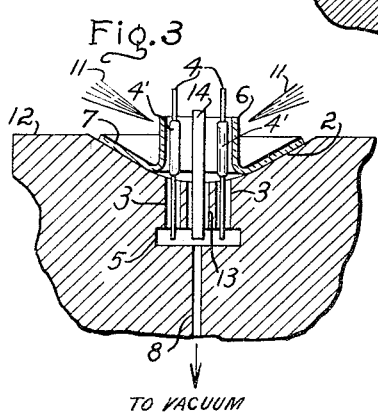

It will be realised that, if desired, an exhaust tube may also be incorporated into the final unit in the same manner, as shown in Fig. 3. In this case the die block 12 will also be provided with a recess 13 for locating a short length of exhaust tube 14 between the wires 4.

Whilst in the foregoing description reference has been made to a non-automatic method of performing the invention it will be appreciated by those skilled in the art that such a process readily lends itself to mechanisation.

We claim:

1. The method of forming a stem for an electric lamp which comprises, assembling a glass stem tube having an outwardly extending flare portion at one end of a short tubular body portion with a plurality of lead-in wires extending longitudinally through said body portion, heating said body portion of the stem tube to fuse it around portions of said lead-in wires, and then applying a suction to the fused portion of said stem tube to draw the fused mass of glass to a position immediately contiguous to the said flare portion of the stem tube.

2. The method of making a stem for an electric lamp which comprises, assembling a glass stem tube and lead-in wires in sealing interrelation on a die-block with an outwardly extending flange on one end of the tube seated on a correspondingly shaped outer portion of the die surface and the tubular portion of the tube upstanding from the central portion of the die surface and surrounding the lead-in wires, heating the glass tube to soften the upstanding tubular portion thereof and collapse it onto and around the lead-in wires and close off the said tube, and drawing the softened glass of the tube against the central portion of the die surface to form it to the shape thereof and simultaneously seal it around the lead-in wires by establishing a vacuum between the softened glass and the said central die surface portion.

3. The method of making a stem for an electric lamp which comprises, assembling a glass stem tube and lead-in wires in sealing interrelation on a die-block with an outwardly flaring flange on one end of the tube seated on a correspondingly flared outer portion of the die surface and the tubular portion of the tube upstanding from the central portion of the die surface and surrounding the lead-in wires, heating the glass tube to soften the upstanding tubular portion thereof and collapse it onto and around the lead-in wires and close off the said tube, and drawing the softened glass of the tube against the central portion of the die surface to form it to the shape thereof and simultaneously seal it around the lead-in wires by evacuating the space between the softened glass and the said central die surface portion.

4. The method according to claim 1 wherein the portions of said conductors which are to be sealed into the glass of the stem tube are pre-glassed before assembly with the said stem tube on said die-block.

ROBERT LEONARD BREADNER.
CHARLES HENRY SIMMS.

REFERENCES CITED

The following references are of record in the file of this patent:

UNITED STATES PATENTS

| Number | Name | Date |
| --- | --- | --- |
| 544,248 | Cutler | Aug. 6, 1895 |
| 872,530 | Meeker | Dec. 3, 1907 |
| 1,266,614 | Newcomb | May 21, 1918 |
| 1,395,963 | Kuppers | Nov. 1, 1921 |
| 2,190,788 | Horn | Feb. 20, 1940 |
| 2,318,652 | Wiener | May 11, 1943 |